United States Patent [19]
Junkers

[11] Patent Number: 5,137,408
[45] Date of Patent: Aug. 11, 1992

[54] FASTENING DEVICE

[76] Inventor: John K. Junkers, 7 Arrowhead La., Saddle River, N.J. 07540

[21] Appl. No.: 802,139

[22] Filed: Dec. 3, 1991

Related U.S. Application Data

[63] Continuation of Ser. No. 570,142, Aug. 17, 1990, abandoned.

[51] Int. Cl.$^5$ .............................................. F16B 37/08
[52] U.S. Cl. ..................... 411/432; 411/433; 411/222
[58] Field of Search ............ 411/432, 1, 433, 147, 411/383, 384, 366, 427, 533, 534, 916, 917, 924, 926, 931, 932, 933, 939, 948, 998, 190, 215, 216, 221, 222, 223, 224, 226, 229, 231, 237, 248, 249, 250, 225, 253, 254, 292, 312

[56] References Cited

U.S. PATENT DOCUMENTS

| | | | |
|---|---|---|---|
| 2,489,613 | 11/1949 | Beswick | 411/433 |
| 2,633,176 | 3/1953 | Fears | 411/432 |
| 3,383,973 | 5/1968 | Gazal | 411/1 |
| 3,435,777 | 4/1969 | Schaaf | 411/432 X |

FOREIGN PATENT DOCUMENTS

| | | | |
|---|---|---|---|
| 672538 | 10/1963 | Canada | 411/428 |
| 182117 | 3/1887 | France | 411/427 |
| 1262330 | 4/1961 | France | 411/147 |
| 2066402 | 7/1981 | United Kingdom | 411/383 |

*Primary Examiner*—Rodney M. Lindsey
*Attorney, Agent, or Firm*—Striker, Michael J.

[57] ABSTRACT

A fastening device comprises a pin-shaped fastener having an axis, and means for tightening and loosening the fastener, the tightening and loosening unit including one element provided with first connecting means for connecting the one element with the fastener and also provided with second connecting means, and another element provided with third connecting means cooperating with the second connecting means of the one element for connecting the other element with the one element, so that when a rotary force is applied to at least one of the elements, the elements are shifted coaxially in opposite axial directions and the fastener is displaced in an axial direction.

10 Claims, 5 Drawing Sheets

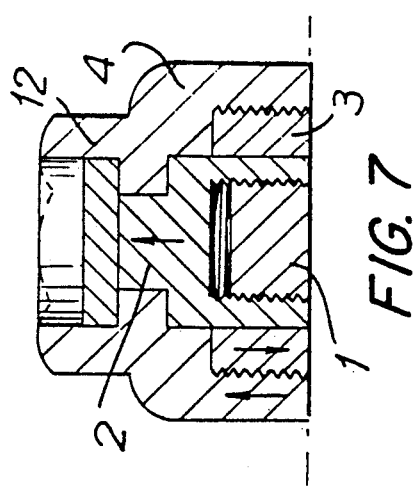
FIG. 7
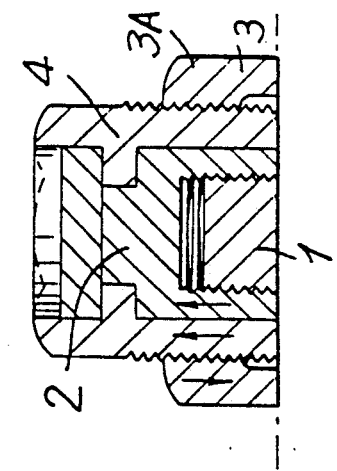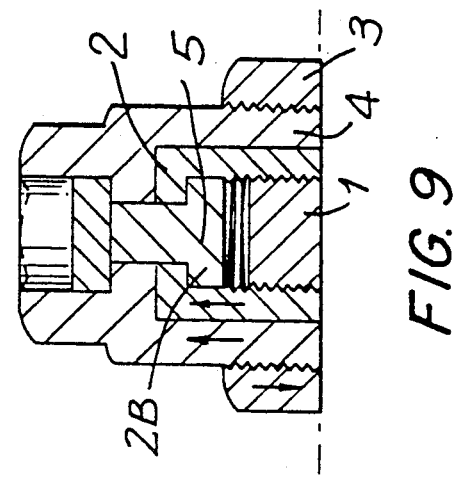
FIG. 10
FIG. 9
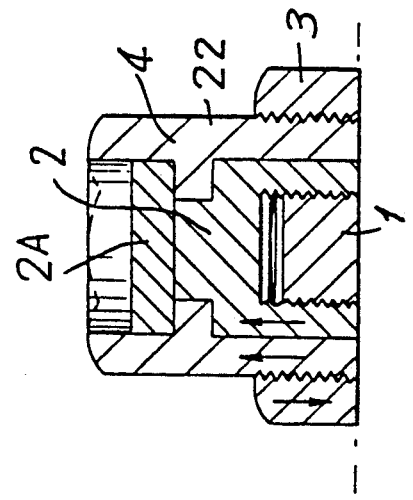
FIG. 8

FASTENING DEVICE

This is a continuation of application Ser. No. 570,142 filed Aug. 17, 1990, now abandoned.

BACKGROUND OF THE INVENTION

The present invention relates to a fastening device. More particularly, it relates to such a fastening device which includes a pin-shaped fastener formed for example as a bolt, and means for tightening the bolt in an object or loosening the bolt from an object.

Fastening devices of the above mentioned general type are known in the art. A known fastening device includes a bolt and means for tightening the bolt, which also can be used for loosening the bolt. There are several ways of tightening a bolt. The most common method to tighten the bolt is by turning a nut which is threaded on the bolt. In the industry usually there are 8 threads per inch, which means that with each turn the nut is turned down 125/1000th of an inch or the bolt is elongated by that value. This method was used successfully over the past century. However, with the use of new materials for fasteners and new design methods for the threads, turning of the nut sometimes result in galling of bolt threads, especially since the bottom half of the bolt threads to which the nut is connected take over 65% of the load.

New tightening methods were developed. One of the oldest methods is to elongate the bolt by heat. Heating rods are inserted into a hole in the center of the bolt and the bolt is heated up until it elongates. The nut is put on the bolt and when the bolt cools off and tends to retract to its original length, it is stopped by the nut and thus provides clamping force to an object, for example a flange. The problem with this method is that equal clamping force can be achieved only if all bolts are equally elongated. To establish this, requires a 24 hour cool off period, after which the bolts are measured. Those that do not conform have to be reheated and retightened and also remeasured after the cool off period. This, in turn, is extremely time consuming. Loosening of the heated bolts is another problem since by reheating the bolt, the usual heat corrosion between the bolt and nut threads does not loosen up. Thus, slugging wrenches or other power tools are necessary.

Another method to achieve equal bolt elongation is the turn of the nut method. It is known that a bolt with 8 threads will give 125/1000th of an inch elongation with each turn. The problem is to establish as of when, because unless the flange is settled and cannot be squeezed further, elongation will not take place.

Still another method includes the use of torque. Torque is supposed to take into consideration the coefficient of friction during turning. However, as the friction between the nut and the flange face is dependent on a variety of circumstances, the desired bolt elongation is not always achieved. Therefore, torque is applied there where equal clamping force is more important than precise elongation. In most applications it is more than sufficient. However, turning of the nut has some side effects, namely as follows:

Turning of a nut creates torsion in the bolt due to the bolt's resistance toward turning. Sometimes this resistance is so great that the calculated torque is not sufficient to achieve the desired bolt elongation, since the applied torque is reduced by the torque taken to overcome the torsion.

Turning of the nut can gall bolt threads due to the bolt resistance toward turning, making the bolt useless. Since bolts are the most expensive parts of a fastening device and delivery times of large diameter bolts are long, no one wants to take the risk of ruining bolts.

Turning of the nut by means of conventional torque wrenches causes side loads on the bolt. Under some circumstances that can ruin the bolt as well.

Turning of the nut down on the flange causes facial friction between the nut and the flange face. This friction is difficult to control and even more difficult to calculate.

Turning of the nut and holding on to a washer to pass on the reaction force, as disclosed for example, in U.S. Pat. Nos. 3,247,741, 3,633,446 and 3,868,872 is one way of eliminating the side loads. However, the fastening devices disclosed in these references do nothing to eliminate bolt torsion, galling of threads and facial friction.

Turning a shear nut as shown in U.S. Pat. Nos. 2,940,495 and 3,247,741 is basically a way to achieve accurate torque, which at the time of these inventions was almost impossible to achieve with conventional tools, especially on large diameter bolts. The bolt is, however, still subjected to the unwanted side effects resulting from the use of regular nuts.

Turning down an outer nut which has a shear portion close to where it first engages with the bolt and which is frictionally engaged with an inner nut that is also connected to the bolt by threads, as shown in U.S. Pat. No. 3,602,976, is another way to achieve accurate torque. Yet it is still subjected to unwanted side effects resulting from the use of regular nuts.

In order to eliminate the above mentioned side effects during turning down a nut, entirely new methods were developed. The basic idea of these methods is to elongate the bolt by pulling it, instead of turning down the nut under force. For this purpose hydraulic and mechanical tensioning devices were invented. The most common device includes a bolt and a nut arrangement in which the bolt sticks out over the nut by at least the amount of threads engaged by the nut. This requires extra long bolts, making the bolts usually supplied from original equipment manufacturers useless. By drilling holes into each flat face of the nut and by having a sleeve over the nut having an oval opening and sitting on the flange with one of its ends and supporting a load cell with its other end directly or indirectly threaded onto the bolt end, the bolt can be pulled up by pressurizing the load cell. By turning the nut down when the bolt is elongated by means of a pin inserted into the holes in the flats through the oval opening, the nut is tightened onto the flange and the tensioner can be taken off.

Theoretically this is an efficient system. However, its drawbacks are that the nut cannot be tightened enough, so that it allows bolt relaxation. It is possible to take this relaxation into consideration when elongating the bolt and to overstretch the bolt to accommodate for the relaxation. However, since the relaxation is an unknown factor depending on the individual flange portion, the surface of the flange and cleanliness between the connecting nut and the flange face, even overstretching does not provide accuracy. In addition, setting up this system requires turning down the nut over twice the threaded area, turning down the tensioner over the threaded area that sticks out over the nut, pressurizing the system, turning the nut by hand, and unthreading the tensioner afterwards which is at least four times as long as torquing down a regular nut. Also, when the load is transferred from the tensioner to the mating threads of the nut and bolt, there is danger of thread and faying surface embedment. Furthermore, loosening of the nut, especially when there is corrosion, is not possible with the tensioner. Conventional tools are then required.

In U.S. Pat. No. 4,075,923 a nut on the top of the tensioner is provided to allow tightening of the nut with the right amount of torque to avoid bolt relaxation. This system will provide accurate bolt elongation and will limit the amount of side loads applied to the bolt when turning down the nut as the setting torque for the nut does not exceed 30% of what would normally be required to torque the nut down for equal bolt elongation. The problem with this system is that it is expensive since each hydraulic tensioner stays on the bolt, it requires the use of two tools, namely the hydraulic tensioner and a power wrench, and it requires a lot of overhead clearance which in many cases is not available.

Hydraulic nuts were invented where a nut with a washer is screwed onto the bolt where the nut contains a hydraulic jack connected with the washer, so that when hydraulic pressure is applied the nut pulls up the bolt through the opening in the washer. This system works, except when no mechanical device is used to assure that the bolt remains elongated, the system depends on its seals which can dry out and cause loss of pressure. When a mechanical take-up device is used, the loss of pressure becomes irrelevant as the nut remains in its place. The problem with this, however, is the bolt relaxation which can take place when the tension is transferred from the nut to the take-up device, unless the take-up device is turned down by a power wrench, in which case a further tool is necessary. The elongation achieved can also be held by putting shims between the nut and the washer. Even though this does not require a separate tool it will cause loss of bolt load.

A mechanical device was proposed, including a round nut which has a series of allen screws threaded through from face-to-face and a washer which sits between the flange and the nut and which has a round hole in its center to clear the bolt threads. To achieve bolt elongation, the allen screws have to be tightened manually in a criss-cross manner and at equal torque. In this case exact bolt elongation can be achieved, however it takes hours what can be done in minutes with electric, pneumatic or hydraulic torque wrenches. Also, loosening of the allen screws can become a problem if there is salt water or heat corrosion, since the female hex heads cannot be designed big enough to accommodate large enough allen keys to hold up when the torque requirement for loosening doubles or triples as the whole system would get too big for normal applications.

To overcome the problem of tensioners, hydraulic bolts were proposed as shown for example in U.S. Pat. No. 3,886,707. Here the bolt is elongated by hydraulic means pushing a piston connected to one end of the bolt up and thus achieving the bolt elongation. The problem is that unless the nut is turned down with a power tool, the bolt relaxation can take place. Using a power tool in addition to the hydraulic system is not necessarily something consumers are willing to do, especially when its application is tough since the hydraulic hose is attached to the middle of the bolt and connects to the pump so that only open end wrenches can be used.

SUMMARY OF THE INVENTION

Accordingly, it is an object of the present invention to provide a fastening device which avoids the disadvantages of the prior art.

In keeping with these objects and with others which will become apparent hereinafter, one feature of the present invention resides, briefly stated, in a fastening device which has a pin-shaped fastener having an axis, and means for tightening or loosening said fastener including at least two parts one of which is engageable with the fastener and which are turnable relative to one another and during tightening or loosening are axially movable relative to one another so that when a rotary force is applied to at least one of said parts said parts are displaced coaxially in opposite directions.

The term "tightening" and "loosening" is used here to define that the fastening device is used to apply bidirectional or varying tension. When a threaded connector is being tightened the axial tension is being increased, and when the threaded connector is loosened the axial tension is being decreased.

When the fastening device is designed in accordance with the present invention, it eliminates the above mentioned disadvantages and at the same time provides accurate and even bolt elongation. Equal and accurate clamping force is achieved in a fast and inexpensive way and without necessarily requiring new or special bolts. In other words, in the present invention the friction between a nut face and an object face (flange face) is eliminated partially or completely and a user is left with a very predictable coefficient of friction. It is therefore possible to achieve precise bolt elongation or load through application of torque or pressure. By eliminating partially or completely the turning under pressure in the bolt thread, torsion, galling of threads and other side effects become non-existent. Thus, the present invention provides such a fastening device which results in benefits of some of the above mentioned methods and at the same time does not have their drawbacks.

While the invention is shown as limited to the circumferential area taken up by conventional fasteners, the fastening device can be larger in diameter without affecting its application on existing equipment, since most conventional fasteners provide side clearance for the use of a socket. Thus, the present invention can be actually also designed so as to be equivalent to the socket diameter when the turning is accomplished with a tool that stays within this dimension. In other words, the inventive device can be used for all conventional applications, as well as for new applications. It is constructed on the one hand to replace regular nuts without changing the existing bolt On the other hand, it is not limited to this construction since it is also feasible to alter the bolt in order to achieve the same effect.

The active part of the inventive device can be made so that once the elongation or loosening of the bolt is accomplished, it can be removed and reused on the next fastener. By turning two parts of the tightening-loosening means simultaneously in opposite directions, the tightening or loosening process is speeded up considerably and sideloads can be eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 1-16 are views showing twenty different modifications of a fastening device in accordance with the present invention;

DESCRIPTION OF THE PREFERRED EMBODIMENTS

A fastening device in accordance with the present invention is a pin-shaped fastener which has an axis and is used for fastening at least one object, preferably for connecting two objects with one another, and referred to in this application as a bolt. The fastening device also has means for tightening or loosening the bolt and including two elements which will be referred to here as parts of the tightening/loosening means.

Figure 1:
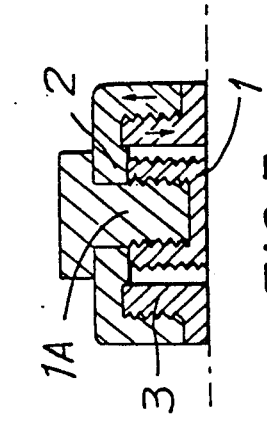

A fastening device shown in FIG. 1 includes a bolt 1 provided with a groove 6 in which a plurality of bearings 7 are arranged. Means for tightening/loosening the bolt 1 includes two parts identified with reference numerals 2 and 3. The bolt 1 has an end provided with an annular groove, while the part 2 has an inner opening for receiving the bolt end and also provided with a groove associated with the groove of the bolt end. A plurality of bearings 6 are received in the associated grooves of the bolt end and the part 2, to connect the bolt end with the part 2. The part 2 has an outer thread which cooperates with an inner thread of the part 3. The part 3 abuts with its lower end against a surface of an object, for example a flange surface. For tightening the bolt 1, a rotary force is applied to the part 2 so that it is turned relative to the part 3 on the cooperating threads and displaced axially upwardly, while the part 3 moves axially downwardly. During the displacement of the part 2 axially upwardly the bolt end is pulled upwardly so as to tighten the bolt. Loosening of the bolt is performed in a reverse order.

Figure 2:
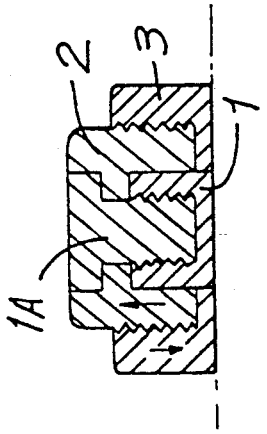

In the embodiment of FIG. 2, the bolt 1 is provided with a threaded opening in which a bolt connector 1a having an outer thread is screwed. During turning the part 2 it is displaced axially upwardly while the part 3 is displaced axially downwardly, and the part 2 pushes the bolt connector 1a upwardly so as to pull the bolt end 1 upwardly and therefore to tighten the bolt. For this purpose the part 2 has a radially inwardly extending flange between the upper surface of the bolt end 1 and the lower surface of the upper part of the T-shaped bolt connector 1a. The loosening of the bolt 1 is performed in a reverse order.

Figure 3:
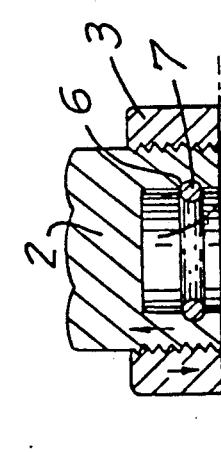

In the embodiment of FIG. 3, the part 2 has an inner thread, while the part 3 has an outer thread cooperating with the inner thread of the part 2. The part 3 has an inner opening with a diameter greater than the diameter of the bolt end 1. The bolt connector 1a extends upwardly beyond the part 2, and the part 2 is received between the upper portion of the T-shaped part 1A and the upper surface of the bolt end 1. The operation of this device substantially corresponds to the operation of the device in the preceding Figures.

Figure 4:
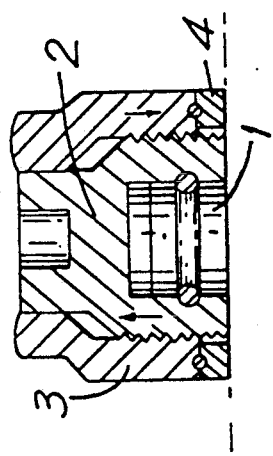

In the embodiment of FIG. 4, the parts 2 and 3 have a prismatic shape each provided with an upper cylindrical portion, a lower cylindrical portion and a conical portion connecting the upper and lower portions with one another. The lower portion of the part 3 has an inner thread cooperating with an outer thread provided on the lower portion of the part 2. The upper portion of the part 2 has an opening, for example non-circular, engaging by a turning tool. A low friction washer is located between the lower surface of the part 3 and the flange surface, and a bearing or the like is located between the upper surface of the washer and the lower surface of the part 3. The tightening or loosening of the bolt 1 is performed by turning of one of the parts 1 relative to the other part, or by simultaneously turning the parts 2 and 3 in opposite directions.

Figure 5:
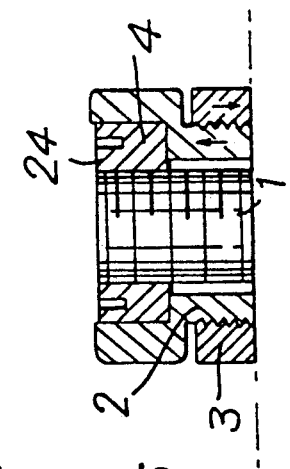

In the embodiment of FIG. 5, the part 2 has a cup-shaped portion which accommodates a holding part 4 and engaging formations for a tool. The holding part 4 has an inner thread cooperating with the outer thread of the bolt end. When the part 2 is turned, it is displaced axially upwardly, the part 3 is displaced axially downwardly, the holding part 4 is pushed upwardly so as to pull upwardly the bolt end and to tighten the bolt.

Figure 6:
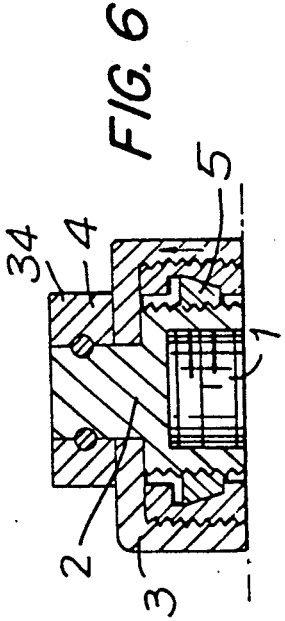
Figure 13:
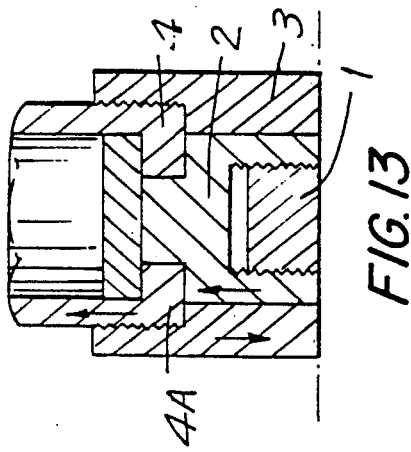

In the embodiment of FIG. 6, the part 2 has an outer thread, the part 3 has an inner thread, and an intermediate part 7 having an outer thread cooperating with the inner thread of part 3 is located between the part 2 and the part 3 and provided with a wedge-shaped opening. A wedge-shaped part 5 has an inner thread cooperating with the outer thread of the part 2 and an outer wedge-shaped surface cooperating with the wedge-shaped wall of the opening of the intermediate part 7. The part 2 also has an inner thread cooperating with the outer thread of the bolt end. Finally, a holding part 4 is attached to the part 2, for example by a bearing located in the part and radially extending into a groove in the part 2 and into another groove in a spring-biased pin 4'. During turning of the part 3 it is displaced upwardly, while the intermediate part 7 is displaced downwardly, and the part 3 pushes the holding part 4 upwardly so as to pull the part 2 upwardly and thereby to pull the bolt end upwardly to tighten the bolt. After a predetermined tightening of the bolt, the wedge-shaped part 5 is clamped by its outer wedge-shaped surface against the wedge-shaped surface of the wall of the opening in the intermediate part 7. Thus, the locking of the tightened bolt is obtained. After this, the part 3 together with the part 4 can be removed by unscrewing of the part 3 from the intermediate part 7 and removing the bearing between the parts 2 and 4 in a known manner.

In the embodiment of FIG. 7, the parts 2 and 3 are no longer connected with one another by cooperating threads. An additional, substantially cup-shaped part 12 surrounds the whole structure and has a lower portion provided with an inner thread cooperating with an outer thread of the part 3. The part 2 has an inner thread cooperating with an outer thread of the bolt end 1. The upper portion of the part 2 has an outer hexagonal contour and an inner recess in which a transverse portion 2A of the part 2 is received and connected to the part 2. When a rotary force is applied to the part 4, it is displaced axially upwardly so that the part 3 is displaced axially downwardly. During the axial upward displacement of the part 4 it pulls the transverse portion 2A of the part 2 and therefore the whole part 2 upwardly and thereby pulls the bolt end axially upwardly to tighten the bolt. While in FIG. 7 and some subsequent Figures the transverse portion of the part 2 is shown as fixedly connected with the remaining portion of the part 2, it is also possible that the transverse portion 2A of the part 2 is connected with the retaining portion of the part 2 turnably about the axis of the bolt. This eliminates friction between part 4 and the transverse portion 2A of the part 2, since during turning of the part 4, the transverse portion 2A of the part 2 also rotates therewith and relative to the remaining portion of the part 2.

In the embodiment of FIG. 8; an additional part 22 is substantially similar to the additional part 12 of FIG. 9. However, it is here located between the parts 2 and 3. It also has an upper portion, and also when a rotary force is applied to the additional part 22 it is displaced axially upwardly, the part 3 is displaced axially downwardly, and the part 4 is displaced axially upwardly to pull the bolt end and to tighten the bolt. In this embodiment, similarly to the embodiment of FIG. 7, and the embodiments of some subsequent Figures (FIGS. 9–13), there is a free turning between the part 2 and the additional part.

In the embodiment of FIG. 9, the part 2, or more particularly its remaining portion is composed of two portions, namely a lower portion provided with an opening and a vertical passage, and a lifting portion 2B extending through the passage and abutting against a lower surface of a transverse web of the remaining portion of the part 2. During turning of the part 4 and its axial displacement upwardly, the part 4 pushes the transverse portion 2A of the part 2B upwardly, the portion 2A pulls the portion 2B upwardly, which in turn pulls the retaining portion of the part 2 upwardly to pull the bolt end and to tighten the bolt.

The embodiments of FIG. 10 substantially corresponds to the embodiment of FIG. 8. However, in the embodiment of FIG. 10 the part 3 is cup-shaped and has a transverse portion 3A provided with an inner thread engageable with the outer thread of the additional part 4. In this construction, the number of thread convolutions which are in engagement with one another between the parts 4 and 3 is always the same during turning of the part 4.

Figure 11:
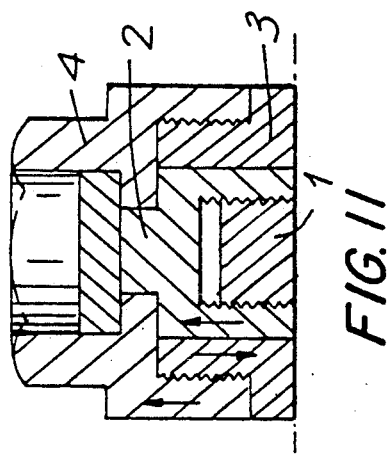

The fastening device in accordance with the embodiment of FIG. 11 substantially corresponds to that of the embodiment of FIG. 7. The difference is that in the embodiment of FIG. 11 the part 3 has a lower transverse portion which extends radially outwardly and located underneath the lower surface of the additional part 4 to cause additional friction.

Figure 12:
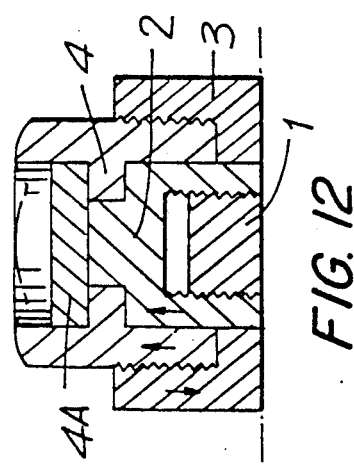

In the embodiment of FIG. 12, the part 3 also has a radial portion extending underneath the lower surface of the additional part 4. However, the part 3 is located outside of the part 4, and the radial portion of the part 3 extends radially inwardly from the remaining portion of the part 3.

In the embodiments of FIGS. 7–12 the additional part 4 always has an upper portion, a lower portion, and a central radially inwardly extending portion 4A located underneath of the transverse portion 2A of the part 2. In contrast, in the embodiment of FIG. 13 the additional part 4 does not have the lower portion extending downwardly from the central portion 4A. Here, the additional part 4 has only the upper portion and the central portion 4A.

Figure 14:
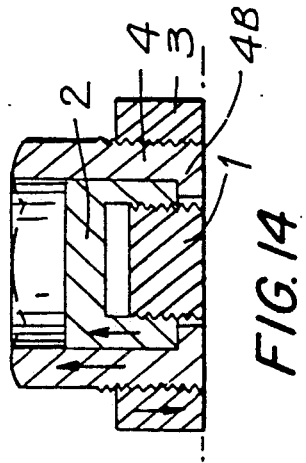

In the embodiment of FIG. 14 the additional part 4 has a lower portion 4B which extends radially inwardly underneath the lower surface of the part so that when the part 2 is turned and displaced upwardly it displaces the part 2 upwardly pulling the bolt in the same direction while the part 3 is displaced downwardly and has a lower surface arranged to be placed against a flange surface. The part 4 has a hexagonal contour to be turned by a tool.

Figure 15:
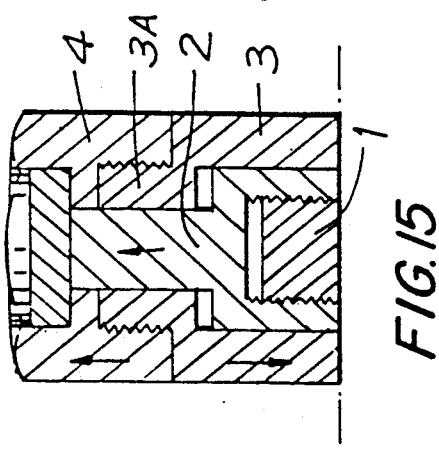

In the embodiment of FIG. 15, the part 3 has an upper narrower portion 3A with an outer thread engaging with an inner thread of the additional part 4. In other aspects, it substantially corresponds to the embodiment of FIG. 7.

Figure 16:
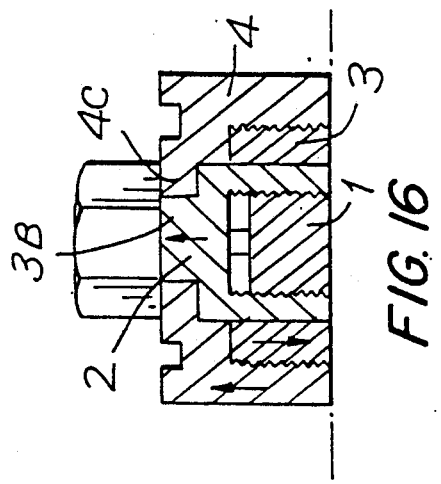

In the embodiment of FIG. 16 the additional part 4 has a castillated upper surface to be engaged by the tool for turning the part 4. The part 4 has an upper radially inwardly extending portion 4C. The part 2 has an upper narrow 2B extending through the central opening in the portion 4C. The portion 2A is connected to the portion 2B so that when the part 4 is turned the part 3 displaces downwardly while the part 4 displaces the parts 2 and 1 upwardly. The portion 2A can be connected to the portion 2B in a fixed way, and a stop 11 screwed in the part 2 to prevent its turning relative to the bolt end can be added so that the portion 2A can be used to absorb the reaction forces of a tool which is subjected to reaction forces while applying a turning force to a member. The inner threads of the part 2 and 4 run in the same direction.

Figure 17:
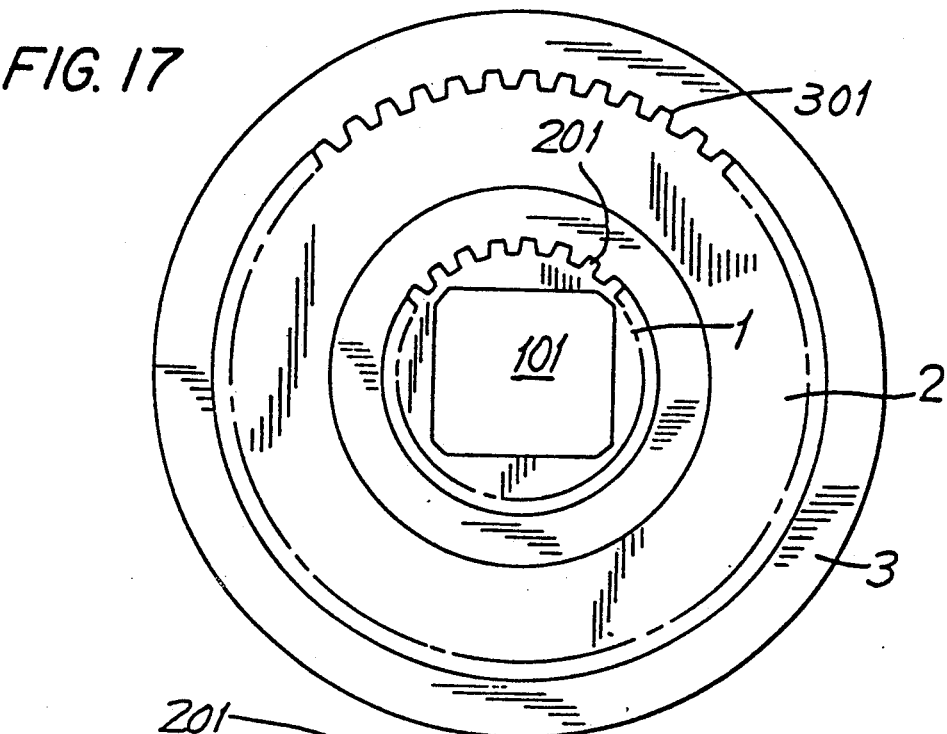
FIGS. 17 and 18 are detailed side and plan view of the invention fastening device.
Figure 19:
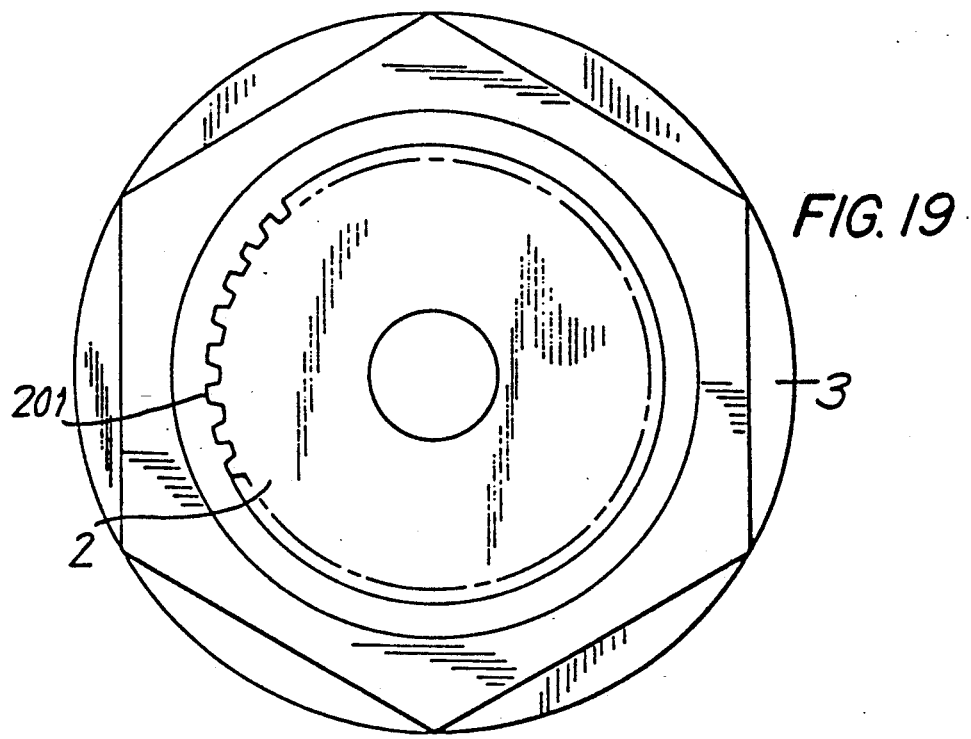
FIGS. 19 and 20 are detailed side and plan view of another modification of the inventive fastening device.

In the embodiment shown in FIGS. 17 and 19 the bolt 1 is connected to the part 2 by threads 203. The part 2 is connected to the part 3 by a circumferential roller bearing 202. This allows to obtain a low friction so as to avoid that the part 2 turns while the part 3 is being turned. Depending on the application the part 4 can have a shoulder 404 which increases the friction so as to avoid that the part 4 turns while the part 3 is turned.

Reference numeral 201 identifies connecting means that can be made a part of the part 2 for loosening the part 2 if corroded or for running the part 2 down on the bolt. 202 in general is a rotary connecting means for connecting the part 2 and the part 3. As specified hereinabove, in this case these means are steel ball bearings inserted through a passage 303 around the circumference. 301 is connecting means for connecting with a power tool to be used with the fastening device. 401 can also be a connecting means for the power tool. The groove 402 is provided to assure that the number of engaging threads between the parts 3 and 4 always remain the same during tightening, so that the friction remains the same as well. The part 3 is connected with the part 4 by threads 403. 203 can be right thread while 403 can be left thread or vice-versa.

Figure 18:
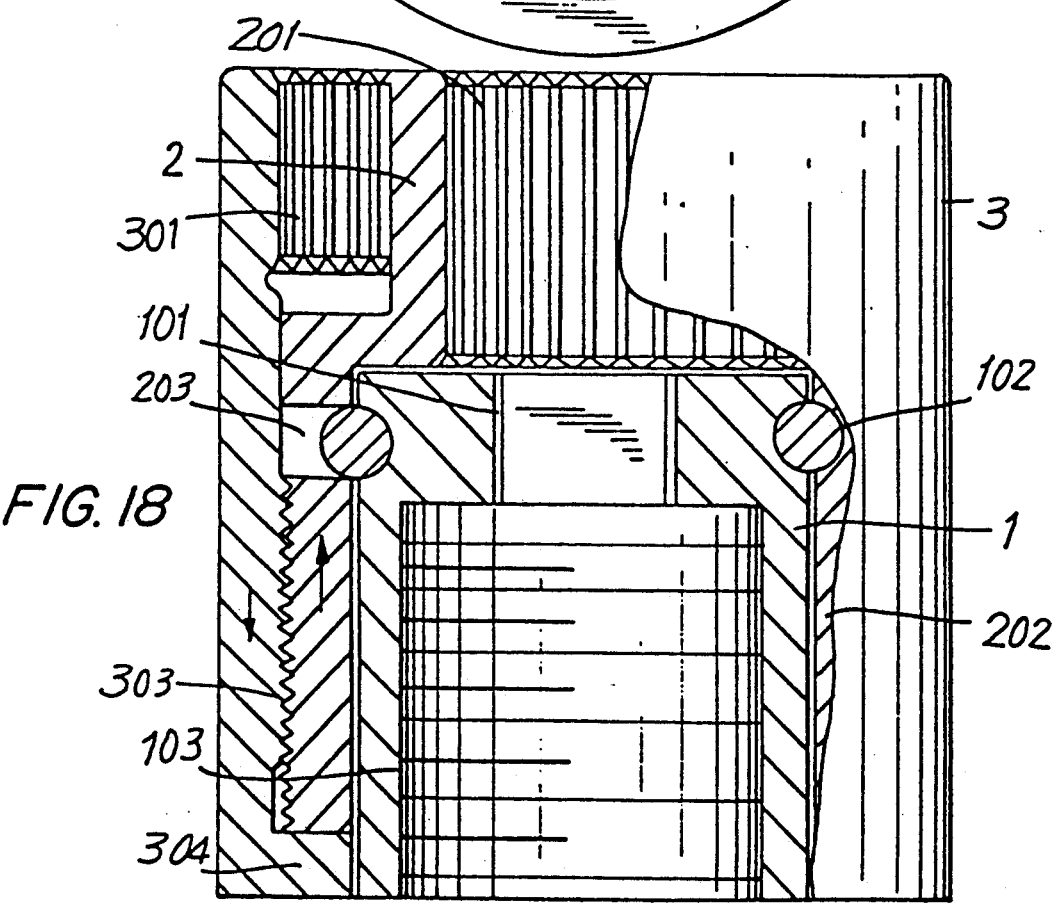
Figure 20:
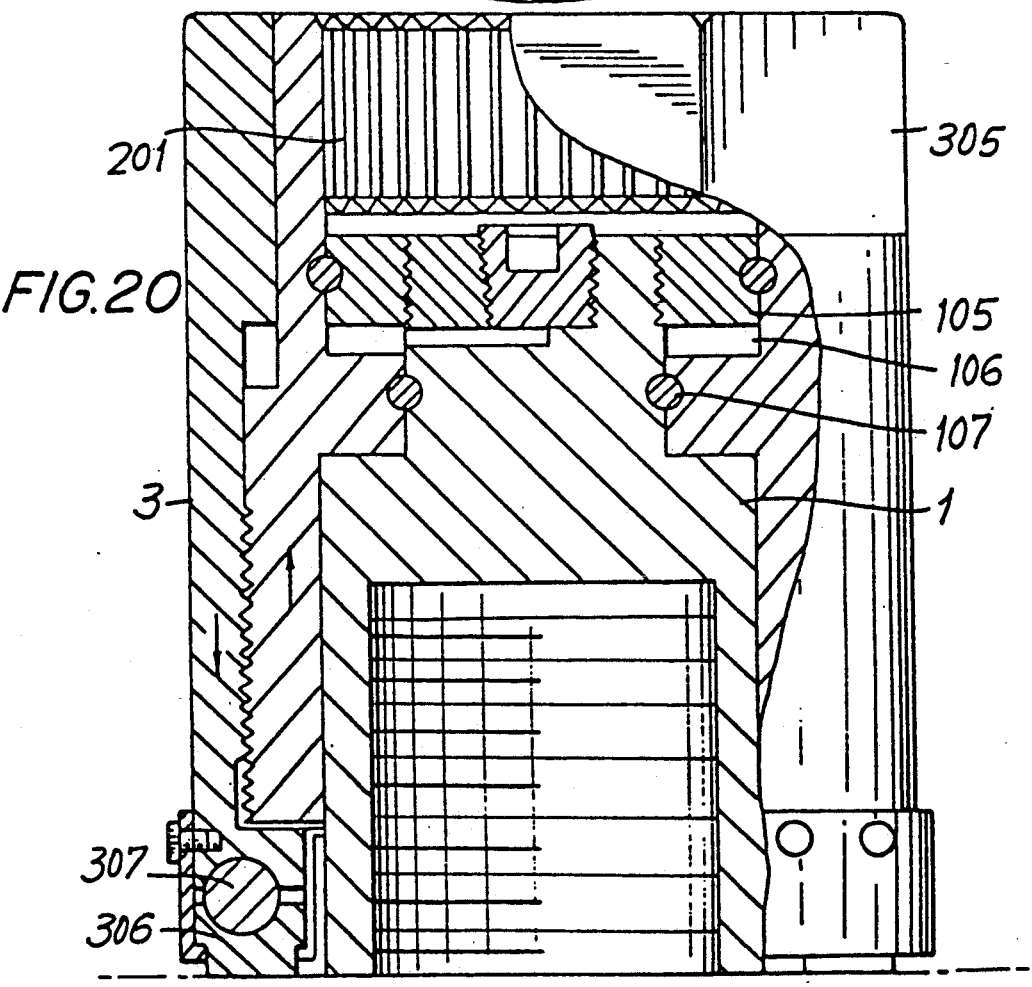

FIGS. 19 and 22 show an embodiment which is substantially similar to the embodiments of FIGS. 17 and 18. However, in the embodiment of FIGS. 19 and 20 the part 3 has a hexagonal portion 405 on the top, rather than a female spline in FIGS. 17, 18. The part 2 has a piston-type arrangement 205 which traps a hydraulic oil in a sealed area 206. The seals are identified with reference numeral 207. This reduces the friction drastically so that when the part 3 is turned, the part 2 does not turn along. The part 3 is provided with a washer 406 and a bearing 407, so that facial friction is reduced and the part 405 can be turned as well. By turning the parts 405 and 301 in opposite directions, the speed of the operation is drastically improved.

Generally speaking, all embodiments disclosed in the present application can be classified in accordance with three systems. In a first system, which is shown for example in FIGS. 1 and 7 the means for tightening-/loosening a bolt includes one element provided with first connecting means for connecting the one element to a bolt, and also provided with second connecting means, and another element provided with a third connecting means cooperating with the second connecting means of the one element for connecting the other element with the one element, so that when rotary force is applied to one of the elements they are shifted coaxially in opposite directions.

In accordance with a second system in the embodiments of FIG. 2-6, 7-16, the one element has an inner part provided with the first connecting means connected with the bolt and an outer part rotatably connected to the inner part and provided with the second connecting means which cooperate with a third connecting means of the other element to connect the other element with the outer part of the one element. When a rotary force is applied to at least one of the above mentioned elements or their parts, the elements are displaced coaxially in opposite directions.

Finally, in accordance with a third system shown in FIG. 6, the tightening/loosening means include locking means, so that when the desired bolt elongation is achieved as a result of application of the force, the locking means can be locked to the bolt to retain the elongation.

It is to be understood that other systems including more parts than used in the above mentioned can also be utilized in accordance with the inventive principle. The areas of the parts which can cause friction can either be coated with a low friction finish, or bearings such as a needle or ball bearing can be arranged to reduce the friction. In some instances grease might be enough, whereby in other instances metal-to-metal might work. It all depends on the design and the job. This is important since the friction between parts has to be kept low so that the one part pushing down on the flange does not turn.

It will be understood that each of the elements described above, or two or more together, may also find a useful application in other types of constructions differing from the types described above.

While the invention has been illustrated and described as embodied in a fastening device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A fastening device, comprising a pin-shaped fastener having an axis; and means for tightening and loosening said fastener, said tightening and loosening means including a first element provided with first connecting means for connecting said first element with said fastener and also provided with second connecting means, a second element provided with third connecting means cooperating with said second connecting means of said first element, said elements being formed to interact so that when at least one of said elements which does not turn on an object located outside the fastening device is turned, said elements are shifted coaxially in opposite axial directions without turning in a thread of said fastener and said fastener is displaced in an axial direction.

2. A fastening device as defined in claim 1, wherein said first element has a first part provided with said first connecting means connecting said first part of said first element with said fastener, and a second part which is rotatably connected with said first part and provided with said second connecting means for connecting said second part of said first element with said second element.

3. A fastening device as defined in claim 1; and further comprising locking means arranged so that when said fastener is displaced in an axial direction and the desired elongation of said fastener is achieved, said locking means is locked to said fastener to retain said elongation.

4. A fastening device as defined in claim 3, wherein said locking means is arranged in said second element.

5. A fastening device as defined in claim 3, wherein said locking means is arranged so that when it is locked to said fastener, said first element can be removed and then said locking means continues to retain said elongation.

6. A tightening and loosening unit for a pin-shaped fastener having an axis, comprising a first element provided with first connecting means for connecting said first element with said fastener and also provided with second connecting means; a second element provided with third connecting means cooperating with said second connecting means of said first element, said elements being formed to interact so that when at least one of said elements which does not turn on an object located outside the unit is turned, said elements are shifted coaxially in opposite axial directions without turning in a thread of said fastener and said fastener is displaced in an axial direction.

7. A tightening and loosening unit as defined in claim 6, wherein said first element has first part provided with said first connecting means connecting said first part of said first element with said fastener, and a second part which is rotatably connected with said first part and provided with said second connecting means for connecting said second part of said first element with said second element.

8. A tightening and loosening unit as defined in claim 6, and further comprising locking means arranged so that when said fastener is displaced in an axial direction and the desired elongation of said fastener is achieved, said locking means is locked to said fastener to retain said elongation.

9. A tightening and loosening unit as defined in claim 8, wherein said locking means is arranged in said second element.

10. A tightening and loosening unit as defined in claim 8, wherein said locking means is arranged so that when it is locked to said fastener, said first element can be removed and then said locking means continues to retain said elongation.

* * * * *